United States Patent
Barrett et al.

(10) Patent No.: US 6,581,059 B1
(45) Date of Patent: Jun. 17, 2003

(54) DIGITAL PERSONA FOR PROVIDING ACCESS TO PERSONAL INFORMATION

(75) Inventors: Robert Carl Barrett, Sunnyvale, CA (US); Paul Philip Maglio, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/490,846

(22) Filed: Jan. 24, 2000

(51) Int. Cl.$^7$ ............................................. G06F 17/30

(52) U.S. Cl. ............................................. 707/9; 707/2

(58) Field of Search ................... 707/1–10, 100–104, 707/200–206, 500–501, 511–517; 709/101–104, 200–206, 212–227; 345/700–701, 744, 762

(56) References Cited

U.S. PATENT DOCUMENTS

| | | | |
|---|---|---|---|
| 5,504,837 A | 4/1996 | Griffeth et al. | |
| 5,630,159 A | 5/1997 | Zancho | |
| 5,717,923 A | 2/1998 | Dedrick | |
| 5,761,662 A | 6/1998 | Dasan | 707/10 |
| 5,793,972 A | 8/1998 | Shane | |
| 5,845,070 A | 12/1998 | Ikudome | |
| 6,275,824 B1 * | 8/2001 | O'Flaherty et al. | 707/9 |

FOREIGN PATENT DOCUMENTS

| | | | |
|---|---|---|---|
| JP | 4279935 | 10/1992 | G06F/9/44 |
| WO | WO9515635 | 6/1995 | H04L/12/24 |
| WO | WO9729443 | 8/1997 | G06F/17/60 |
| WO | WO9843146 | 10/1998 | |

OTHER PUBLICATIONS

Lee, J.G. et al., "ICOMA: an Open Infrastructure for Agent–based Intelligent Electronic Commerce on the Internet," International Conference on Parallel and Distributed Systems, Seoul, Dec. 10–13, 1997, pp. 648–655.

* cited by examiner

Primary Examiner—Alford Kindred
(74) Attorney, Agent, or Firm—Lacasse & Associates, LLC; Randy W. Lacasse; Khan Q. Tran, Esq.

(57) ABSTRACT

A method and system provides a structured and accessible information repository for an entities personal information. An information server contains a personal information database and a set of information preferences associated with the personal information database. The personal information database contains personal information about an entity, such as name, phone number, address, etc. The information preferences define an entities preferences regarding the conditions of use under which the personal information will be released. When another computer or user of another computer, a requestor, requests personal information from the information server, the requestor then identifies the information it is requesting and provides the conditions under which the information is to be used. The received conditions of use are compared to the set of information preferences to determine if the received conditions of use are acceptable. If the received conditions of use are acceptable the information is retrieved and provided to the requestor. If the received conditions are unacceptable, the requestors request is denied. The requestor and freely addressable access interface may then negotiate the conditions of use until acceptable conditions are reached, or until it is determined that acceptable conditions cannot be obtained. Encryption and third party certification are used to provide security to the system. Records of the transactions are maintained to provide a "paper trail" in case the agreement is broken.

15 Claims, 3 Drawing Sheets

DIGITAL PERSONA FOR PROVIDING ACCESS TO PERSONAL INFORMATION

BACKGROUND OF THE INVENTION

1. Field of Invention

The present invention relates generally to the field of computer databases. More specifically, the present invention is related to access of personal information stored in computer databases.

2. Discussion of Prior Art

The use of computers to provide structured storage and communications of information in order to streamline information processing tasks is quite prevalent in today's society. For instance, even small businesses maintain databases of inventory and accounting information, personnel records, etc. The advantage of computers and associated databases is that they provide a structured, easily accessible repository for this information. Once entered into the database, this information can easily be modified, processed, organized in different ways, protected against invasion, and aggregated in different manners to provide valuable reports. These capabilities are of great value in productivity, privacy, organization, and help to insure the correct information is used for the appropriate tasks.

While some businesses may locate their accounting and inventory information in a single repository, providing structure and ease of access, an individual's personal information is not typically handled as productively. Information, such as address books and calendars, may be stored on a personal digital assistant, or on various computer desktop applications, and is inaccessible to other computer programs or other computers. Other information, such as frequent flyer miles, medical prescriptions, grocery store buying habits, shoe size, etc., are not stored on a computer anywhere, or are stored on systems which the individual does not have immediate access to. In accordance with the present invention, such information is stored in a single repository, or, alternatively, a central access point for such information is provided. The storage of such information in this manner provides a digital persona for the individual which can be accessed by other computers.

The right to access information such as inventory and accounting information is relatively easily determined. Either the user has a reason to access the information or not. Consequently, a simple system of access privilege mechanisms is used to determine who can access the information. When dealing with an individual's personal information, many factors are considered by the individual to determine whether they would provide the information to the other party. Some information, such as their bank account, is much more private, and therefore would only be given out to trusted entities and only for a very good reason, such as to a merchant to complete a transaction. Other information is much less private and may be given out more freely. Therefore, there is a need for a more complex manner of determining whether access to the information should be allowed. According to the present invention, a complex manner is provided in which a repository or central access point, hereinafter referred to as information server, and the computer attempting access, hereinafter the requestor, negotiate the terms of use and accessibility of the personal information based upon preferences set by the user.

Recently, a protocol known as Platform for Privacy Preferences Project (P3P) has been proposed by the World Wide Web Consortium (W3C). The P3P protocol enables World Wide Web sites to inform a user of a web browser of a Web sites privacy practices and allow the user of the web browser to exercise preferences based upon those practices. The P3P protocol focuses on storing limited amounts of personal information in a single program, such as a web browser, along with preferences relating to the information. Thereafter, when a user of the web browser is visiting a Web site, the Web site presents a request, along with information regarding the privacy practices of the Web site, to the web browser. If the privacy practices are compatible with the users preferences, the web browser supplies the information to the Web site. If the privacy practices are not compatible, a negotiation may be pursued, and if agreeable terms can be obtained, then the information is released. If agreeable terms are not met, the information is not released. While this provides a single storage place for the information, storage of the information in a web browser limits the accessibility of the information. For instance, a computer at a bank cannot request information that is needed to complete a transaction, unless the user is using the web browser and visiting the actual Web site of the bank. Therefore, a process, such as a loan approval, which has different stages and may require different types of information which could not be obtained earlier, during each stage, cannot be completed without contacting the loan applicant (user of the web browser) physically. This is due to the fact the loan applicant may not even be aware the information is needed and therefore would not know to navigate the web browser to the appropriate Web site. Such a need to contact the loan applicant draws out a process which could have been easily and quickly carried out had the information been easily accessible. At other times, the user of the web browser may be remotely located from the web browser, but needs access to their personal information. The web browser cannot be addressed by another computer and accessed to provide the information and therefore, the information is inaccessible to a user remotely located from their web browser. In summary, the web browser is not freely addressable.

The following references describe the use of user profiles to perform certain tasks or the negotiation between intelligent agents, however, none of these references provide for a central repository of personal information of an entity which is easily accessible.

The U.S. Pat. No. 5,504,873 describes a communication system in which entities want to be involved by exchanging proposals and counter-proposals.

The U.S. Pat. No. 5,630,159 describes a system in which a user stores preferences relating to multiple application devices, such as cellular phones, computers, or automobiles, in a smart card or central database so that the users preferences can easily be set in a new model of the multiple application device.

The U.S. Pat. No. 5,717,923 describes a system for customizing electronic advertisements to an individual user, based upon a user profile. The information of the profile is used to provide targeted information while maintaining the privacy of the individual.

The U.S. Pat. No. 5,761,662 describes a system which retrieves and compiles information to be presented to a user based upon the user's profile.

The U.S. Pat. No. 5,793,972 describes a system that directs an individual to a web page by the use of direct mail marketing. When the user accesses the page a unique page is generated based upon data stored corresponding to the individual.

The U.S. Pat. No. 5,845,070 describes the use of a certification server to facilitate a purchase initiated by a user over the Internet.

The International Application WO 97/29443 describes a negotiation between agents of a distributed processing environment to determine the services performed by each agent in order to accomplish an overall task.

The International Application WO 98/43146 describes a method of negotiation between intelligent agents which allows the agents to disguise their negotiation strategies from other negotiating parties, limits unproductive negotiations, and incorporates dynamic value determination.

The International Application WO 95/15635 describes a communications network in which management agents negotiate with customer agents to provide new services.

The Japanese Patent Publication JP 04-279935 describes a system for solving problems by negotiating between a plurality of agents having different knowledge bases.

The non-patent literature entitled, "Cooperative Information Agents and Communication," describes an architecture in which a communication manager negotiates contracts of communication and transaction protocols with other cooperative information agents.

The non-patent literature entitled, "ICOMA: an Open Infrastructure for Agent-based Intelligent Electronic Commerce on the Internet," describes an architecture and message protocol for inter-agent negotiation in an open infrastructure for agent based electronic commerce.

Whatever the precise merits, features and advantages of the above cited references, none of them achieve or fulfills the purposes of the present invention. These and other objects are achieved by the detailed description that follows.

SUMMARY OF THE INVENTION

The present invention provides a system which provides a structured and accessible information repository for an entity's personal information. An information server comprises a freely accessible access interface, a personal information database, and a set of information preferences associated with the personal information database. The personal information database contains personal information about an entity, such as name, phone number, address, shoe size, medications, etc. The information preferences define an entities preferences regarding the conditions of use under which the personal information will be released. When a requestor, such as another computer, requests personal information from the information server, the requestor communicates with the information server by addressing the freely accessible interface. The requestor then identifies the information it is requesting and provides the conditions under which the information is to be used. The freely addressable access interface then compares the received conditions of use to the set of information preferences to determine if the received conditions of use are acceptable. If the received conditions of use are acceptable, the freely addressable access interface retrieves the information and provides it to the requestor. If the received conditions are unacceptable, the freely addressable access interface denies the requestors request.

In another embodiment of the present invention, the requestor and the freely addressable access interface negotiate on the conditions of use until an agreement is reached, or until it is determined that an agreement cannot be reached. When the freely addressable access interface initially determines that the received conditions of use are unacceptable, the freely addressable access interface proposes new conditions of use to the requestor which the requestor may accept, or in turn proposes other new conditions of use and so forth, until the agreement is reached or until it is determined the agreement cannot be reached.

In another embodiment of the present invention, once an agreement on the conditions of use has been reached, the freely addressable access interface records the conditions of use of the released information in order to maintain a "paper record" of the transaction. Additionally, the requestor maintains a record of the transaction. Therefore, if the terms of the agreement are violated, a "paper trail" of the agreement exists.

In another embodiment of the present invention, the requestor additionally identifies a separate, third party certification authority, used by the freely addressable access interface to verify the identity of the requestor.

In another embodiment of the present invention, the personal information is converted into a human readable format, for the case that the requestor is a human user of a computer. The freely addressable access interface retrieves the personal information from the personal information database and supplies it to a human readable converter, which converts the information to human readable format. The freely addressable access interface then provides the information to the computer and the information is displayed to the user.

In another embodiment of the present invention, more than one personal information database and associated set of information preferences exists on the same information server.

DESCRIPTION OF THE PREFERRED EMBODIMENTS

Figure 1:
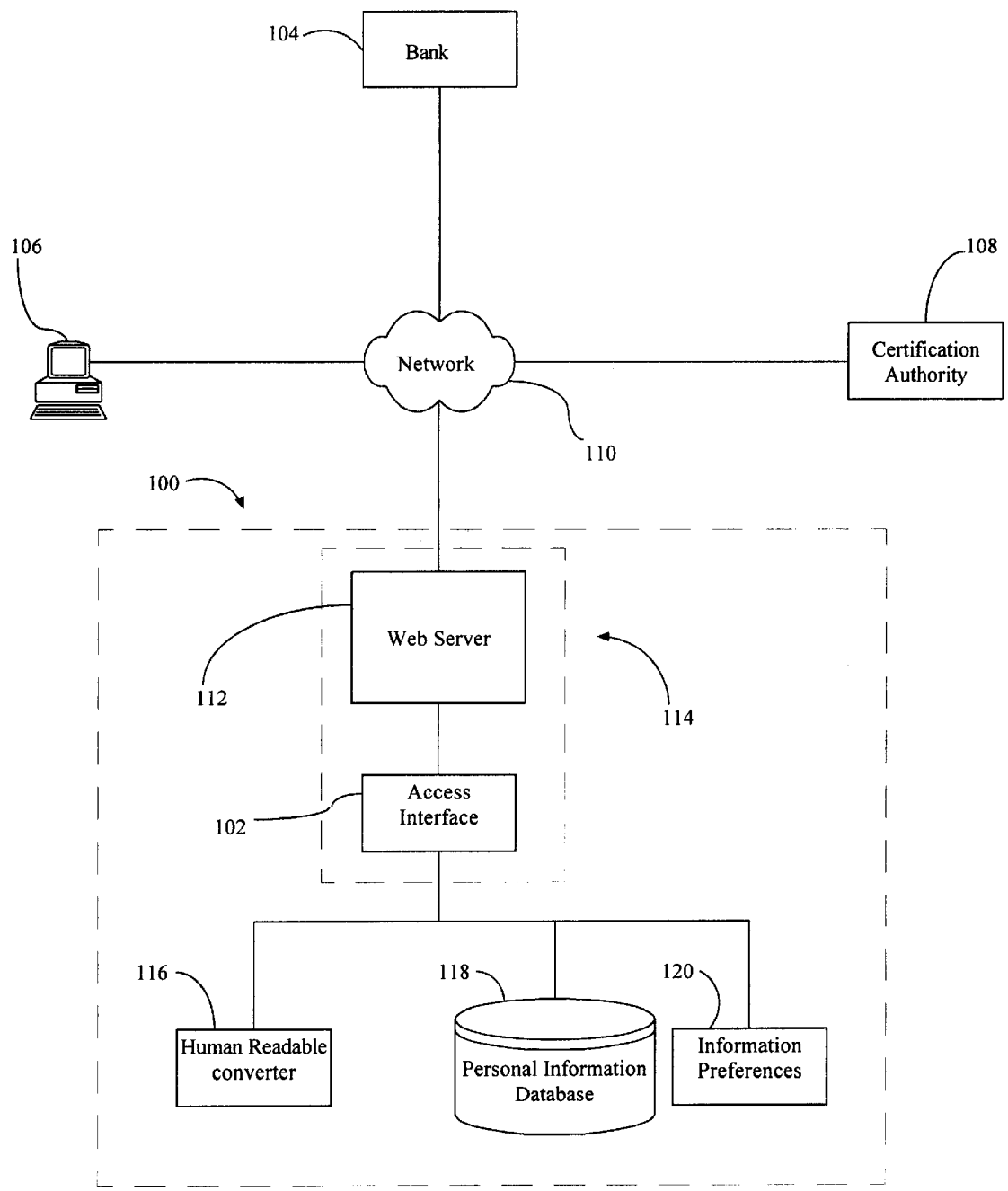
FIG. 1 illustrates the information server of the present invention.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

Typically, personal information is handled manually, with the information being maintained in many different places. Information such as calendars and address books may be maintained on a personal digital assistant, while other information such as the individual's address and phone number is maintained on their personal computer, or not on computer at all. Other information is either maintained on computers inaccessible to the individual, or not maintained on a computer at all. Therefore, the vast majority of a person's personal information is unavailable to other computer programs or other computers. In accordance with the principles of the present invention, an individual's personal information is maintained in a structured and easily accessible electronic or computer based information repository. Such an orderly storage of personal information is advantageous as it alleviates the problems associated with storing the personal information in idiosyncratic ways and manually dealing with the information. Such disadvantages include not having the information available when it is needed, time wasted reading the information to someone requesting it, being bothered by someone requesting basic information, and giving out the information without any clear understanding of the manner in which the information will be used.

It should be noted that, while the present invention is described with regards to an individual's personal information, it is within the spirit and scope of the present invention that the personal information pertains to a small set of individuals, such as a family. Personal information of an individual or small set of individuals (an entity) is any information which the entity would not want publicly available, or, in other words, any information the entity would want to have control over who the information is distributed to and the manner the receiver of the distributed information would use the information.

As described above, a protocol, P3P, has been proposed by the W3C. P3P is focused on allowing a user to store limited personal information in a web browser and allowing the user to define a set of preferences associated with the information. When a user is browsing a Web site, the Web sited requests some or all of the personal information and provides its privacy practices with regards to the information. The privacy practices are then compared with the user's preferences, and if they are compatible, the web browser provides the requested information. While this provides a repository for the user's personal information, the accessibility of the information is limited. The web browser and Web server follow a server client architecture, the web browser is the client while the Web server is the server. As such, the web browser is not freely addressable. In other words, another computer cannot directly address the web browser. When a client contacts a server, the client provides a return address. The server can only contact the client once the client has supplied the return address. Therefore, as discussed above, the web browser cannot be navigated to by another computer and accessed to provide the information.

By providing an information server and defining an information communication protocol, an information ontology, a security mechanism, and an ontology extension mechanism, the present invention provides a structured and accessible information repository, while protecting the manner in which the information is used by the requestor.

The information communication protocol and information ontology are based upon the W3C's P3P specification. The W3C's P3P specification can be found at the World Wide Web site http://www.w3.org/P3P, however, it should be noted that this material is characterized by the authors as a "work in progress" and may change over time. The present invention contemplates using the P3P specification, but it is within the scope of the present invention to use structural or functional equivalents thereof. The information protocol defines the manner in which a proposal is made, further negotiations are performed, and how any other information is exchanged between the requestor and the information server. The information ontology is the basic structure of the personal information while the ontology extension mechanism allows the extension of the basic personal information ontology and provides the ability to map entries from one ontology into another. The modifications necessary to adapt the P3P specification or other equivalents to the present invention is well within the capabilities of one skilled in the art.

FIG. 1 shows a model architecture of the system according to the present invention. The information server 100 comprises a Web server 112, access interface 102, human-readable converter 116, personal information database 118, and a set of information preferences 120. By connecting the information server 100 to a network 110, such as the Internet, the information server 100 is addressable from other computers such as a bank computer 104. The Web server 112 and access interface 102 provide for a freely addressable access interface 114 which is addressable through a universal resource locator (URL). For example, Rob Barrett's personal information database, or "digital persona", is addressable using the URL "http://persona.myprovider.com/rob_barret." The first part of the URL, "http://persona.myprovider.com" provides the address of the Web server 112, while the second portion, "/rob_barret" further points to access interface 102. Therefore, any computer connected to network 110 capable of using the HTTP protocol is capable of initiating contact with the information server 100.

When a requestor contacts the information server 100 to request personal information, the requestor provides an identifier of itself, identifies the information it is requesting, and provides the conditions (e.g., "to complete an entity initiated transaction", "to provide better service", "this information will not be distributed to others", "no record of this information will be retained longer than 24 hours", etc.) under which the information is to be used. This information is routed to the access interface 102. The access interface then uses the set of information preferences 120 to determine whether access is to be given to the requested personal information. The information preferences are preferences set by the entity regarding the allowable uses of then personal information. For example, financial information is designated as only being accessible if it is needed to complete an entity initiated transaction, while the entity's address is accessible if the information is deleted within 24 hours. In addition, the entity is able to designate a typical access privileges mechanism, in other words, the entity may designate that certain computers never have access to the information, always have access, or have access to only portions of the information. The access interface 102 compares both the identity of the requestor to the access privileges mechanism and the conditions under which the information is to be used to the preferences regarding the allowable uses of the information in order to determine whether to provide the information to the requestor.

If the access interface 102 determines from the comparison of the received information to the information preferences that the requestor is not permitted access, the access interface 102 denies the requestor access to the information. If, however, it is determined that the requestor is permitted access, the access interface 102 retrieves the personal information requested from the personal information database 118 and provides it to the requesting computer. The access interface determines whether the requestor is permitted access by first determining if the requestor has access privileges, and if so, the access interface 102 then compares the received conditions of use to the allowable conditions defined in the set of information preferences 120 to determine if the received conditions of use are acceptable. In addition to denying the requestor the requested personal information, the access interface 102 is capable of providing possible new conditions of use, in accordance with the defined information preferences 120, that the requestor is then able to agree to.

The act of providing a request for information and the conditions of use and the subsequent reply from the access interface 102, whether it is a denial or possible conditions of use, is termed a negotiation. Although the initial request, determination of accessibility, and subsequent reply is considered a negotiation, the access interface 102 and the requestor can continue to negotiate if the determination of accessibility is determined to be a negative one, i.e., the requestor is denied access to the personal information requested. The negotiation is continued by the requestor and access interface 102, each providing new possible conditions of use, until acceptable conditions of use are determined, or until a determination is made that acceptable conditions cannot be reached.

If acceptable conditions of use are determined, and the access interface 102 provides the information to the requestor, the access interface 102 creates a "paper trail" of the agreed to conditions of use for the provided information by recording the agreed upon conditions of use. This paper trail is provided to help insure the agreement is not broken, and to provide proof as to what was agreed upon. Appropriate items to record for the paper trail include (but are not limited to) who requested the transaction (requestor), who authenticated the requestor (certificate authority), what information was requested, what the conditions of use of that information were agreed upon, and exactly when (timestamp) this agreement was struck. The recording of the paper trail is made in any suitable place, such as, the access interface 102, personal information 118, Web server 112, information preferences 120, or another separate database. The requestor records the paper trail locally, or alternatively, the requestor, after appropriate authentication, is given access to the paper trail created by the access interface 102 for any of the transactions the requestor was involved in. In this manner, both parties have are capable of accessing a paper trail to provide proof of the transaction.

A security mechanism is also provided to insure that the requestor is providing a true identifier and to insure the transmitted information is not intercepted by "eavesdroppers" while being transmitted. Standard encryption techniques are used to prevent eavesdroppers from intercepting the information as it is transmitted. In order to insure the requestor is providing a true identifier, a separate (third party) certification authority is utilized. When the requestor provides its identity, it also provides an additional identity of a certification authority that is capable of verifying the identity of the requestor. This certification authority is then utilized by the access interface 102 to verify the identity of the requestor.

In order to prevent the unscrupulous use of a false certification authority by the requestor, entities are allowed to define a list of identities associated with third party certification authorities that are allowed to perform the verification. Thus, when the access interface 102 receives the additional identity of the certification authority provided by the requestor, the access interface 102 compares the received additional identity to the defined list of identities to determine if the certification indicated by the requestor is one of the allowable certification authorities. If the indicted authority is allowable, the access interface 102 then performs the verification with the certification authority, and upon a verification of the requestor, performs the subsequent determinations of accessibility. If the indicated certification authority is not an allowable authority, or the requestor cannot be verified, the access interface 102 will deny the requestor access and will not allow any further negotiations.

Figure 2:
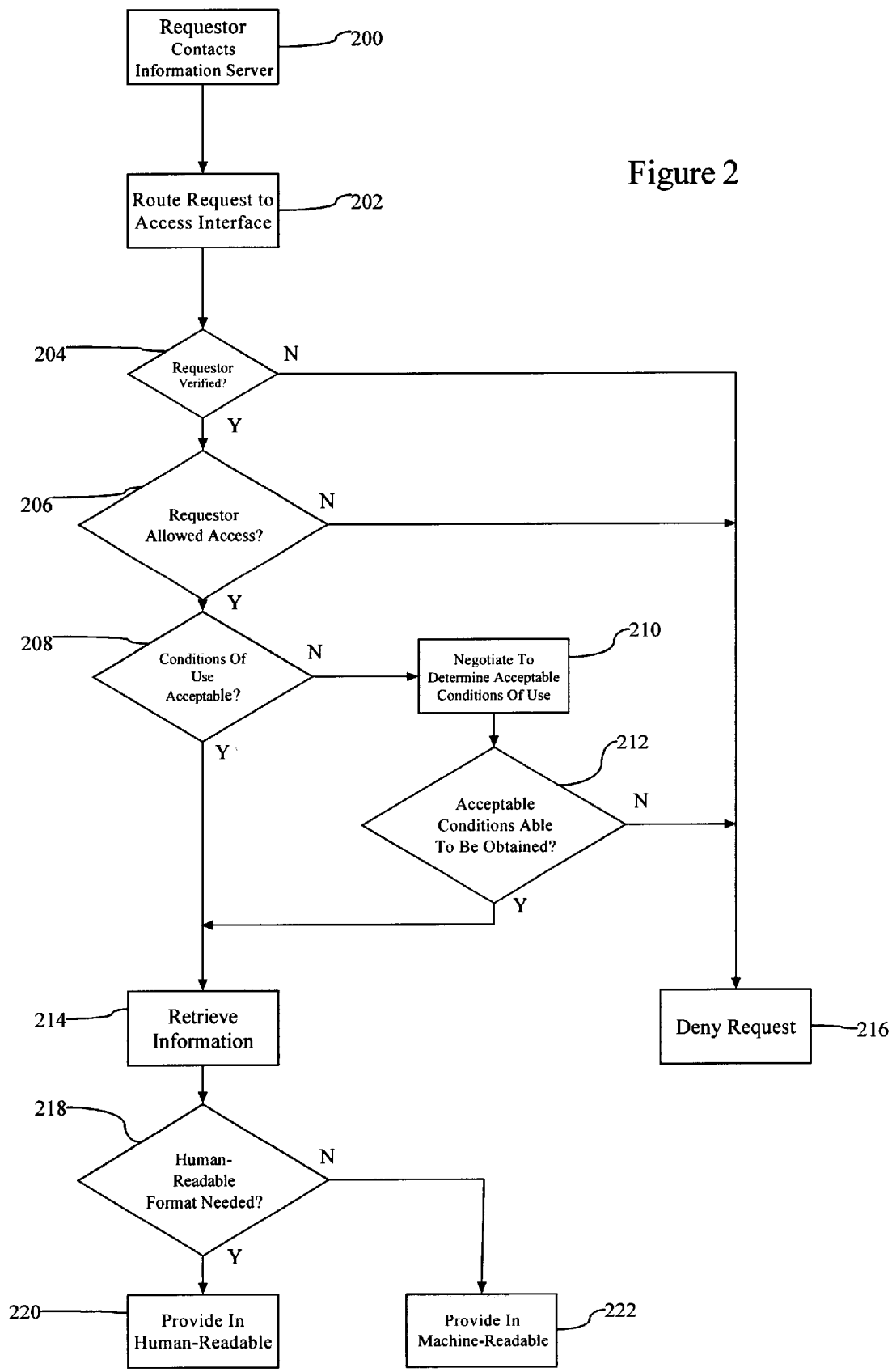
FIG. 2 illustrates the flow of request and access determination of the present invention.

To provide a further illustration of the present invention, an example transaction between a bank computer 104 and the information server 100 will be described using FIG. 1 in conjunction with FIG. 2. In order to complete an entity initiated transaction, such as approval for a loan, bank computer 104 must have certain information concerning the entity, such as the entities home address and phone number. The bank computer 104 sends a request 200 for information, an identifier of the bank computer, an additional identifier of a certification authority, and conditions of use to information server 100. This information is routed 202 to access interface 102. Access interface 102 then compares the additional identifier to a list of defined identifiers of certification authorities. If the additional identifier is one of the ones listed, the access interface 102 verifies the requestor identity 204 utilizing the certification authority 108. Upon verification, the access interface 102 compares the identity of the bank computer to the access privileges mechanism to determine if the bank computer 104 is allowed access 206. If either the verification of the requestor fails or the requestor is not allowed access, the request is denied 216. Access interface 102 then compares the conditions of use, for example the condition supplied by the bank computer 104 is "to complete an entity initiated transaction," to the information preferences regarding address and telephone information to determine if the conditions of use are acceptable 208. If the information preferences define that address and telephone information are accessible under the condition "to complete an owner initiated transaction," the access interface 102 retrieves the information from the personal information database 118, provides it to the bank computer 104 and creates a record of the transaction 214. Otherwise, access interface 102 and the requestor negotiate to determine if acceptable conditions can be determined until it is determined whether or not acceptable conditions of use can be obtained 210, 212. If acceptable conditions are obtained, access interface 102 retrieves the information 214, otherwise, access interface denies the request 216.

In addition to providing the personal information in machine-readable format to another computer, in another embodiment, a human-readable format is supported by providing a human readable set of HTML pages and forms. A user of a personal computer 106 connected to network 110 initiates a request for information from information server 100 and the process as described above is carried out, however, when the personal information is retrieved from the personal information database 118, a determination of whether or not human-readable format is needed 218, and if human readable format is needed, the information is provided to human-readable converter 116 where it is converted to the set of HTML pages and forms and is then transmitted to the requestor 220 and subsequently displayed to a user. Otherwise, the information is provided in machine-readable format 222.

Figure 3:
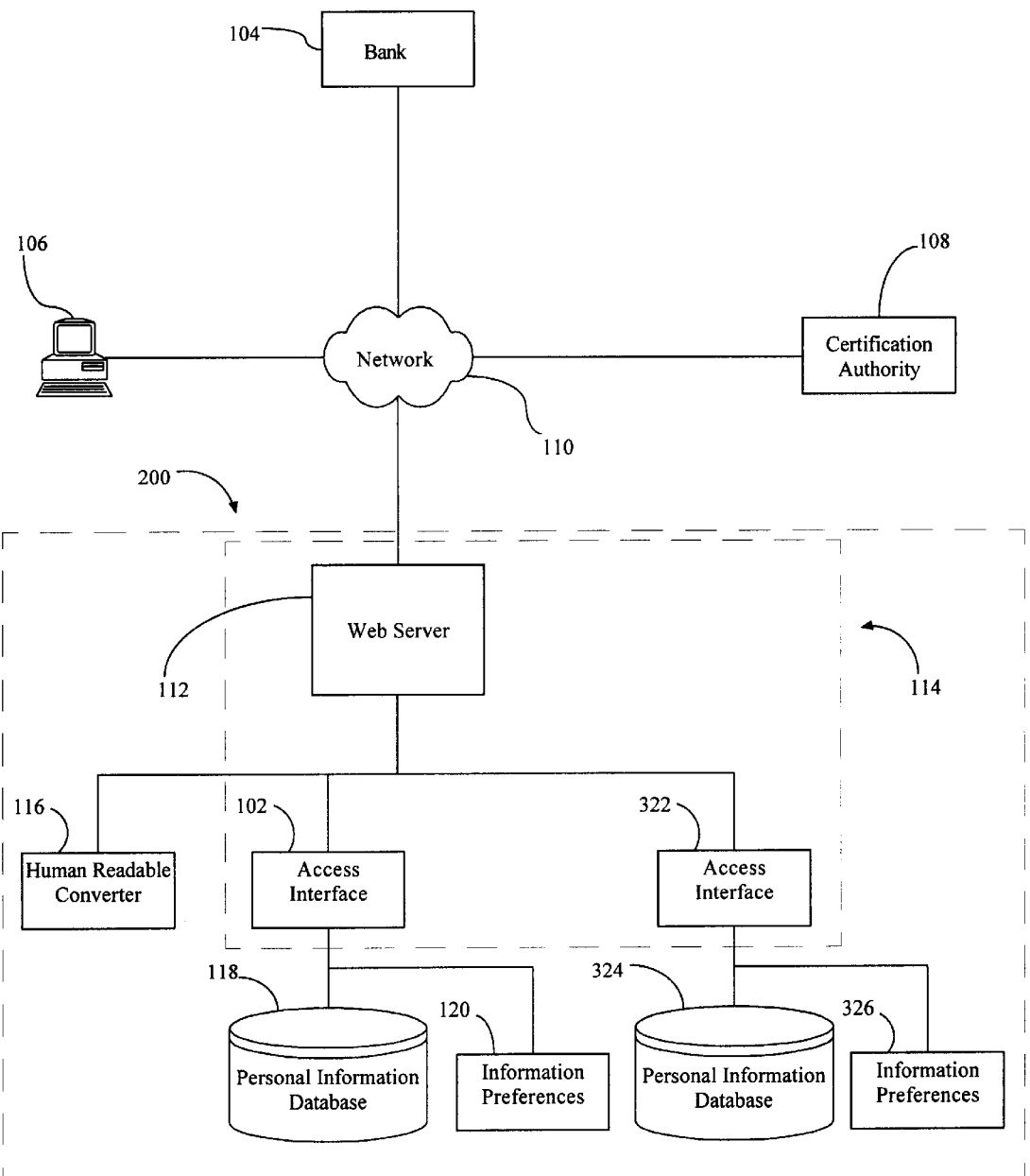
FIG. 3 illustrates the information server wherein more than one personal information database exists on the information server.

In another embodiment of the present invention, more than one digital persona resides on the information server. This is shown in FIG. 3. This system is similar to that shown in FIG. 1, however it comprises additional access interface 322, and information preferences 326 associated with additional database 324. Web server 112, access interface 102, and access interface 322 constitute a freely addressable access interface 114. The Web server is addressed using "http://persona.myprovider.com" as discussed previously. However, the second part of the address is used to determine which of access interface 102 or 322 the communications are routed to. For instance, "http://persona.myprovider.com/rob_barret" would be routed to access interface 102, while "http://persona.myprovider.com/paul_maglio" would be routed to access interface 322. Once communications are routed to the correct access interface, the operation of the system is substantially the same as described in FIG. 1 and FIG. 2.

It should be noted that the information server need not be located on a single computer. It is within the scope of the present invention for the Web server 112, access interface 102, human readable converter 116, personal information database 118, and information preferences 120 to be distributed among a plurality of computer systems. Additionally, it is envisioned that the information server holds a replicated copy of the personal information database, rather than a master copy. That is the master copy resides elsewhere, or portions of the master copy reside at different locations, while the information server maintains an up-to-date copy of the master database. Alternatively, the database is completely distributed with the information server acting as a central access point and capable of locating where the required information resides.

CONCLUSION

A system and method has been shown in the above embodiments for the effective implementation of a structured and accessible personal information repository. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the network the information server is connected to may be any network (e.g., LAN, WAN, Internet, WWW, or radio network. The addressing and communication protocol may be any other suitable protocol other than using a URL and HTTP (e.g., Gopher, SMTP, Telnet, FTP) and the information communication protocol can be based upon any present or future privacy protocols. The personal information, records of transactions, information preferences and all other data related thereto are stored in computer memory, static or dynamic, in any suitable manner providing access.

We claim:

1. A system for providing access to electronically stored personal information of an entity, comprising:
    a personal information database storing personal information of an entity;
    a set of information preferences associated with said database, said information preferences defining requestor accessibility rights and conditions of use for said personal information;
    a freely addressable access interface, said interface receiving an identifier of said requestor and conditions under which personal information is to be used, whereby said interface determines if said personal information is accessible by said requestor and,
    upon a positive determination of accessibility, said personal information is retrieved from said database by said interface and provided to said requestor, and upon an initial negative determination of accessibility, said interface iteratively negotiates with said requestor by offering differing conditions of use until a positive determination of accessibility is made or until it is determined that a positive determination of accessibility cannot be obtained.

2. A system for providing access to electronically stored personal information of an entity, as per claim 1, wherein said personal information is provided to said requestor in machine-readable format.

3. A system for providing access to electronically stored personal information of an entity, comprising:
    a personal information database storing personal information of an entity;
    a set of information preferences associated with said database, said information preferences defining requestor accessibility rights, conditions of use for said personal information and a first identity of a certification authority authorized to verify the identity of a requestor;
    an addressable access interface, said access interface interfacing said at least one personal information database to a requestor and receiving an identifier of said requestor and a second identity of a certification authority capable of verifying said requestor and conditions under which personal information is to be used, whereby, upon a determination that said second identity of a certification authority is the same as said first identity of a certification authority, said interface verifies said requestor utilizing the certification authority, and
    wherein upon verification of said requestor, said interface interactively negotiating with said requestor until said received conditions of use are determined to be acceptable to allow access to said personal information based upon said defined conditions of use or until it is determined said acceptable received conditions cannot be obtained, and
    upon a determination that said received conditions of use are acceptable, said interface retrieves said personal information, providing said personal information to said requestor.

4. A system for providing access to electronically stored personal information of an entity, as per claim 3, wherein said system may be implemented locally or remotely on one or more computer-based systems, across networks or existing communication mediums.

5. A system for providing access to electronically stored personal information of an entity, as per claim 4, wherein said across networks element comprises any of LANs, WANs, cellular, Internet or Web based networks.

6. A system for providing access to electronically stored personal information of an entity, as per claim 3, wherein said freely addressable access interface is addressed using HTTP, Gopher, SMTP, Telnet, or FTP.

7. A system for electronically storing personal information data in a structured form and communicating said data to a requestor based upon an agreement to the conditions of use of said data negotiated between an information server providing access to said data and said requestor comprising:
    a personal information database storing personal information of one or more entities;
    a set of information preferences associated with said database, said information preferences defining requestor accessibility rights, conditions of use for said personal information, and a first identity of a certification authority authorized to verify the identity of a requestor;
    a freely addressable access interface, said interface capable of communicating with said database and said set of information preferences,
    a requestor, said requestor capable of communicating with said interface, said requestor communicating an identifier of said requestor, a second identity of a certification authority capable of verifying said requestor and conditions under which personal information is to be used;
    wherein upon receiving said communication, said interface compares said second identity of certification authority to first identify of a certification authority and upon determination that said second identity of a certification authority is the same as said first identity of a certification authority, said interface verifies said requestor utilizing the certification authority, and, upon verification of said requestor, said interface negotiates with said requestor until said received conditions of use are determined to be acceptable to allow access to said personal information based upon said defined conditions of use or until it is determined acceptable received conditions cannot be obtained, and upon an acceptable determination, said interface retrieves said personal information, provides said personal information to said requestor and retains a record of said acceptable received conditions of use to be stored.

8. A system for electronically storing personal information data in a structured form and communicating said data to a requestor based upon an agreement to the conditions of use of said data negotiated between an information server providing access to said data and said requestor, as per claim 7, wherein said system may be implemented locally or remotely on one or more computer-based systems, across networks or existing communication mediums.

9. A system for electronically storing personal information data in a structured form and communicating said data to a requestor based upon an agreement to the conditions of use of said data negotiated between an information server providing access to said data and said requestor, as per claim 8, wherein said across networks element comprises any of LANs, WANs, cellular, Internet or Web based networks.

10. A system for providing access to electronically stored personal information of an entity, as per claim 7, wherein said freely addressable access interface is addressed using HTTP, Gopher, SMTP, Telnet, or FTP.

11. A method of retrieving personal data from a central database, said method comprising:

providing a freely addressable access interface, said access interface interfacing with said database;

requesting access to specific personal data located in said central database, said requesting step including sending an identifier of a requestor, an identity of a certification authority capable of verifying said requestor and conditions of use for said personal data to said access interface;

negotiating access to said personal data based upon at least one of said identity of said requestor, said identity of a certification authority capable of verifying said requestor and said conditions of use for said personal data;

renegotiating access to said personal data upon a negative determination of accessibility until a positive determination of accessibility is reached, or until determining a positive determination of accessibility cannot be obtained;

retrieving said specific personal data upon a positive determination of accessibility, and denying access to said specific personal data upon determining a positive determination of accessibility cannot be obtained.

12. An article of manufacture comprising a computer user medium having computer readable program code embodied therein which controls access to personal information comprising:

computer readable program which enables providing a freely addressable access interface;

computer readable program code which enables requesting access to specific personal data;

computer readable program code which enables negotiating access to said personal data computer readable program code which enables renegotiating access to said personal data upon a negative determination of accessibility until a positive determination of accessibility is reached, or until determining a positive determination of accessibility cannot be obtained;

computer readable program code which enables retrieving said specific personal data upon a positive determination of accessibility, and a computer readable program code which enables denying access to said specific personal data upon determining a positive determination of accessibility cannot be obtained.

13. A computer program product usable with a programmable computer having computer readable program code embodied therein which controls access to personal information comprising:

computer readable program which enables providing a freely addressable access interface;

computer readable program code which enables requesting access to specific personal data;

computer readable program code which enables negotiating access to said personal data computer readable program code which enables renegotiating access to said personal data upon a negative determination of accessibility until a positive determination of accessibility is reached, or until determining a positive determination of accessibility cannot be obtained;

computer readable program code which enables retrieving said specific personal data upon a positive determination of accessibility, and a computer readable program code which enables denying access to said specific personal data upon determining a positive determination of accessibility cannot be obtained.

14. A method of processing information among distributed computer based-systems over a network which controls access to personal information comprising:

transmitting a request to access specific personal data located in a central database, said request including sending an identifier of a requestor, an identity of a certification authority capable of verifying said requestor and conditions of use for said personal data;

transmitting negotiation data to negotiate access to said personal data based upon at least one of said identity of said requestor, said identity of a certification authority capable of verifying said requestor and said conditions of use for said personal data;

transmitting renegotiation data to renegotiate access to said personal data upon a negative determination of accessibility until a positive determination of accessibility is reached, or until determining a positive determination of accessibility cannot be obtained;

transmitting said specific personal data upon a positive determination of accessibility, and transmitting denial data to deny access to said specific personal data upon determining a positive determination of accessibility cannot be obtained.

15. A system comprising computer readable program code, said program code embodied upon and divided among multiple computer storage systems, said program code processing data between the divided portions of said program code over a network for controlling access to personal information, comprising:
  computer readable program code which implements a personal information database for storing personal information of one or more entities;
  computer readable program code which implements a set of information preferences associated with said database for defining requestor accessibility rights, conditions of use for said personal information and a first identity of a certification authority authorized to verify the identity of a requestor;
  computer readable program code which implements a freely addressable access interface for communicating with said database and said set of information preferences,
  computer readable program code which comprises a requestor for communicating an identifier of said requestor, a second identity of a certification authority capable of verifying said requestor and conditions under which personal information is to be used;
  computer readable program code which implements a negotiation of said conditions of use, and,
  wherein upon receiving said communication, said interface compares said second identity of a certification authority to a first identity of a certification authority and upon a determination that they are the same, said interface verifies said requestor utilizing the certification authority, and upon verification of said requestor, said interface negotiates with said requestor until said received conditions of use are determined to be acceptable to allow access to said personal information based upon said defined conditions of use or until it is determined acceptable received conditions cannot be obtained, and upon an acceptable determination, said interface retrieves said personal information, provides said personal information to said requestor and retains a record of said acceptable received conditions of use to be stored.

* * * * *